United States Patent
Metzger et al.

(10) Patent No.: US 9,790,996 B2
(45) Date of Patent: Oct. 17, 2017

(54) VEHICLE JOINT

(71) Applicant: DANA AUTOMOTIVE SYSTEMS GROUP, LLC, Maumee, OH (US)

(72) Inventors: Seth A. Metzger, Monclova, OH (US); Seung Tark Oh, Ann Arbor, MI (US); Jeffrey A. Dutkiewicz, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/392,394

(22) PCT Filed: Nov. 24, 2014

(86) PCT No.: PCT/US2014/067028
§ 371 (c)(1),
(2) Date: Apr. 27, 2016

(87) PCT Pub. No.: WO2015/077679
PCT Pub. Date: May 28, 2015

(65) Prior Publication Data
US 2016/0319882 A1    Nov. 3, 2016

Related U.S. Application Data

(60) Provisional application No. 61/908,225, filed on Nov. 25, 2013.

(51) Int. Cl.
*F16D 3/223* (2011.01)
*F16D 1/116* (2006.01)
(Continued)

(52) U.S. Cl.
CPC .............. *F16D 1/116* (2013.01); *F16D 3/224* (2013.01); *F16D 3/845* (2013.01);
(Continued)

(58) Field of Classification Search
CPC .......... F16D 1/116; F16D 3/224; F16D 3/845; F16D 2003/846; Y10T 403/67; Y10T 464/10; Y10S 464/906
(Continued)

(56) References Cited

U.S. PATENT DOCUMENTS 1,756,335 A    4/1930  Bijur
1,816,891 A  *  8/1931  Boyden ................... F16D 3/848
(Continued)

FOREIGN PATENT DOCUMENTS

DE          2703467 A1    8/1978

OTHER PUBLICATIONS

European Patent Office, International Search Report with Written Opinion of PCT/US2014/067028; dated Jun. 25, 2015, 10 pages, European Patent Office; Rijswijk, Netherlands.

*Primary Examiner* — Gregory Binda
(74) *Attorney, Agent, or Firm* — Marshall & Melhorn, LLC

(57) ABSTRACT

A vehicle joint has a drive sleeve, a pinion shaft and a drive nut. The sleeve has a vent hole, a first set of splines and a first set of venting grooves. The pinion shaft has a second set of splines engaged with the first set of splines. A fluid gap radially outboard of the engaged spines extends the length of the engaged splines. A second set of venting grooves is engaged with the first set of venting grooves. The pinion shaft also has a first set of threads. The drive nut has a second set of threads engaged with the first set of threads. The drive nut also has a radial aperture extending through the drive nut. The first vent hole is in fluid connection with the radial aperture through some of the features described above.

11 Claims, 2 Drawing Sheets

(51) Int. Cl.
   *F16D 3/224* (2011.01)
   *F16D 3/84* (2006.01)
(52) U.S. Cl.
   CPC ..... *F16D 2003/846* (2013.01); *Y10S 464/906* (2013.01); *Y10T 403/67* (2015.01); *Y10T 464/10* (2015.01)
(58) Field of Classification Search
   USPC ............................. 464/15, 17, 182; 403/342
   See application file for complete search history.

(56) References Cited

U.S. PATENT DOCUMENTS

| | | | |
|---|---|---|---|
| 2,473,036 A * | 6/1949 | Miller, Jr. | ................. F16D 3/24 464/15 X |
| 6,220,967 B1 | 4/2001 | Miller | |
| 7,255,481 B2 | 8/2007 | Mermoud | |
| 7,377,854 B2 | 5/2008 | Wormsbaecher | |
| 7,534,172 B2 | 5/2009 | Wormsbaecher | |
| 7,677,984 B2 | 3/2010 | Hahn et al. | |
| 7,712,994 B2 | 5/2010 | Cermak | |
| 7,997,990 B2 | 8/2011 | Hahn et al. | |
| 8,083,430 B2 | 12/2011 | Cermak | |
| 8,235,395 B2 | 8/2012 | Cermak | |

* cited by examiner

VEHICLE JOINT

RELATED APPLICATIONS

This application is the National Stage of International Application No. PCT/US2014/067028, filed Nov. 24, 2014, which claims the benefit of U.S. Provisional Application No. 61/908,225 filed Nov. 25, 2013.

BACKGROUND

A constant velocity joint is a mechanical coupling in which the rotational speed of the output shaft is the same as that of the input shaft whatever the operating angle of the joint. Constant velocity joints are often used in vehicle drivelines to rotationally connect the various parts of the drivelines.

In one instance, a joint can be used to connect two shafts together. The shafts may be at different angles with respect to one another. The joint not only accommodates the difference in angle, and as mentioned above, transfers the rotation of one shaft to the other shaft.

Constant velocity joints are well known and there are many variations of them. In some embodiments, the joints comprise components that add to the weight, complexity and cost of the joint. In some cases, the joints require special tooling to assemble or disassemble, which makes them more difficult and expensive to service.

It would be desirable to have a constant velocity joint that was lightweight, easy to service and was inexpensive to manufacture. The joint described below meets these requirements.

SUMMARY

A vehicle joint comprises a drive sleeve, a pinion shaft, and a drive nut. The drive sleeve has a first vent hole, a first set of splines and a first set of venting grooves. The pinion shaft has a second of splines, a fluid gap, a second set of venting grooves and a first set of threads. The second set of splines is engaged with the first set of splines. The fluid gap is located radially outboard of the engaged splines and extends the length of the engaged splines. The second set of venting grooves is engaged with the first set of venting grooves. The drive nut has a second set of threads and a radial aperture. The second set of threads is engaged with the first set of threads and the radial aperture extends through the drive nut. The first venting hole is in fluid communication with the radial aperture through the fluid gap, the first and second set of venting grooves and the first and second set of threads.

DESCRIPTION OF THE DRAWINGS

The above will become readily apparent to those skilled in the art from the following detailed description when considered in the light of the accompanying drawings in which.

DESCRIPTION OF THE EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
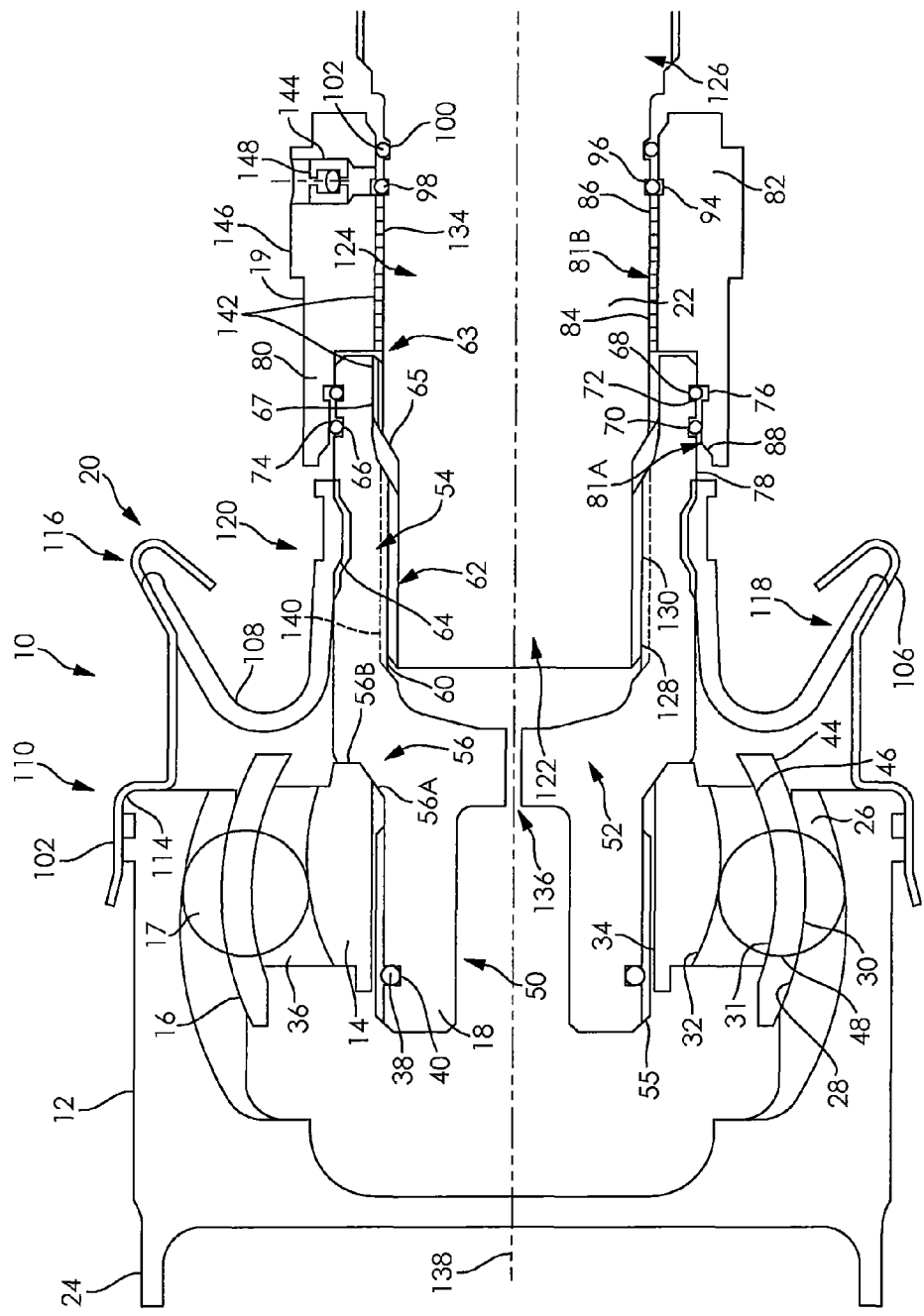
FIG. 1 is a cross-sectional side view of one embodiment of a joint.

FIG. 1 illustrates a constant velocity joint 10 according to an embodiment of the invention. The constant velocity joint 10 includes an outer race 12, an inner race 14, a cage 16, a plurality of torque transferring elements 17, a drive sleeve 18, a drive nut 19, and a boot assembly 20. A plug-in pinion shaft 22 is drivingly engaged with the drive sleeve 18, and the drive sleeve 18 is drivingly engaged with the inner race 14. The constant velocity joint 10 is a Rzeppa style constant velocity joint; however, it is understood that the constant velocity joint 10 may be any other type of constant velocity joint.

The outer race 12 is a hollow cylindrical body formed from a rigid material such as a steel. The outer race 12 is typically forged and then machined in a secondary operation. However, it is understood the outer race 12 may be formed using other processes from any rigid material. An attachment end 24 is formed in the outer race 12, and is drivingly engaged with a shaft (not shown in FIG. 1, but which can be appreciated from FIG. 2). Alternately, it is understood that the attachment end 24 may be coupled to any other type of member.

A plurality of outer tracks 26 are formed in an inner surface 28 of the outer race 12. Each of the outer tracks 26 has an arcuate profile which follows an arcuate path, the arcuate path having a center point different from a center point of the constant velocity joint 10. The outer race 12 includes six outer tracks 26 formed therein. However, it is understood that each of the outer tracks 26 may have a non-arcuate profile and any number of the outer tracks 26 may be formed in the outer race 12. The plurality of outer tracks 26 is equally spaced about the axis of the outer race 12.

The inner surface 28 is a spherical surface of the outer race 12 having a center point common with the center point of the constant velocity joint 10. A radius of the inner surface 28 is complementary to an outer surface 30 of the cage 16. The plurality of outer tracks 26 and the inner surface 28 are precision machined for use as surfaces of a constant velocity joint as is known in the art.

The inner race 14 is a hollow member formed from a rigid material such as a steel. It is understood that the inner race 14 may be formed using any conventional process from any rigid material. When the drive sleeve 18 is drivingly engaged with the inner race 14, the inner race 14 is typically splingly disposed on an end portion of the drive sleeve 18.

The inner race 14 includes an inner race outer surface 31 and an inner race inner surface 32. The inner race outer surface 31 is a spherical surface of the inner race 14 having a center point common with the center point of the constant velocity joint 10. The inner race inner surface 32 defines a cylindrical bore through the inner race 14. A plurality of splines 34 is formed on the inner race inner surface 32 for drivingly engaging the inner race 14 with the drive sleeve 18.

A plurality of inner tracks 36 are formed in the inner race outer surface 30. Each of the inner tracks 36 has an arcuate profile which follows an arcuate path, the arcuate path having a center point different from a center point of the constant velocity joint 10. The diameter of the arcuate profile of each of the inner tracks 36 is complementary to the diameter of the arcuate profile of each of the outer tracks 26 corresponding thereto. As shown in FIG. 1, a depth of each of the inner tracks 36 varies depending on a distance the inner race outer surface 31 is from the axis of the inner race 14. The inner race 14 includes six inner tracks 36 formed therein. However, it is understood that each of the inner tracks 36 may have a non-arcuate profile and any number of the inner tracks 36 may be formed in the inner race 14. The plurality of inner tracks 36 is equally spaced about the axis of the inner race 14.

The inner race 14 is secured to the drive sleeve 18 using a snap ring 38 disposed in a groove 40 formed in an outer surface of the drive sleeve 18. Alternately, any other type of fastener may be used to secure the inner race 14 to the drive sleeve 18.

The cage 16 is disposed between the outer race 12 and the inner race 14. The cage 16 is a hollow body machined from a rigid material such as steel. However, it is understood the cage 16 may be formed using other processes from any rigid material. The cage 16 includes a spherical outer surface 44 and a spherical inner surface 46. A plurality of perforations 48 is formed through the cage 16.

The spherical outer surface 44 has a center point common with the center point of the constant velocity joint 10. The spherical outer surface 44 defines a portion of each of the perforations 48. The spherical outer surface 44 is disposed against and slidingly engages the inner surface 28 of the outer race 12. A diameter of the spherical outer surface 44 is complementary to the inner surface 28 of the outer race 12. The spherical outer surface 44 and the inner surface 28 are precision machined for use as mating surfaces of a constant velocity joint as is known in the art.

The spherical inner surface 46 has a center point common with the center point of the constant velocity joint 10. The spherical inner surface 46 defines a portion of each of the perforations 48. The spherical inner surface 46 is disposed against and slidingly engages the inner race outer surface 30. A radius of the spherical inner surface 46 is complementary to a radius of the inner race outer surface 30. The spherical inner surface 46 and the inner race outer surface 31 are precision machined for use as mating surfaces of a constant velocity joint as is known in the art.

The plurality of torque transferring elements 17 comprises steel spheres disposed in each of the perforations 48, the outer tracks 26, and the inner tracks 36. Each of the torque transferring elements 17 is a ball bearing as is known in the art. However, it is understood that the plurality of torque transferring elements 17 may be any other shape and formed from any other rigid material. A diameter of each of the torque transferring elements 17 is complementary to the diameter of the arcuate profiles of each of the outer tracks 26 and the inner tracks 36. The torque transferring elements 17, the outer tracks 26, and the inner tracks 36 are precision machined for use as mating surfaces of a constant velocity joint as is known in the art. One torque transferring element 17 is disposed and in sliding engagement with each of the outer tracks 26 and each of the inner tracks 36.

The drive sleeve 18 is an annular member formed from a rigid material such as a steel. It is understood that the drive sleeve 18 may be formed using any conventional process from any rigid material. The drive sleeve 18 is disposed against and is in driving engagement with the inner race 14. The drive sleeve 18 comprises a first end portion 50, a middle portion 52, and a second end portion 54. The first end portion 50 is drivingly engaged with the inner race 14, the middle portion 52 is disposed against the inner race 14, and the second end portion 54 is drivingly engaged with the plug-in pinion shaft 22.

The first end portion 50 is a cylindrical shaped portion of the drive sleeve 18 spliningly engaged with the inner race 14. A plurality of splines 55 are formed in an outer surface of the first end portion 50. Alternately, it is understood that the drive sleeve 18 may be unitarily formed with the inner race 14 or coupled thereto in any conventional manner. The groove 40 is formed in the first end portion 50 of the drive sleeve 18.

The middle portion 52 is a substantially disk shaped portion of the drive sleeve 18 located between the first end portion 50 and the second end portion 54. The middle portion 52 has an outer diameter greater than an outer diameter of the first end portion 50. The middle portion 52 defines a sleeve seat 56 of the drive sleeve 18. The sleeve seat 56 in the depicted embodiment has an angled portion 56A connected to a radial portion 56B that extends vertically. When the first end portion 50 is drivingly engaged with the inner race 14, the sleeve seat 56 is disposed against a portion of the inner race 14 with a complementary shape.

The second end portion 54 is hollow and it is formed opposite the first end portion 50. The second end portion 54 comprises a first inner diameter portion 62 and a second inner diameter portion 63. The first inner diameter portion 62 has a smaller diameter than the second inner diameter portion 63. A ramped transition 65 connects the two diameter portions 62, 63.

Axially extending venting grooves 67 are located on the second inner diameter portion 63. The second end portion 54 also comprises a plurality of inner splines 60 in the first inner diameter portion 62, a boot groove 64, a first O-ring groove 66 and a first snap ring groove 68. A first O-ring 70 is located in the first O-ring groove 66 and a first snap ring 72 is located in the first snap ring groove 68. The grooves 66, 68 and rings 70, 72 are located on an outer surface 78 of the second end portion 54. The second end portion 54 is sealingly engaged with a portion of the boot assembly 20.

The plurality of inner splines 60 is formed on the first diameter portion 62 of the second end portion 54 for drivingly engaging the plug-in pinion shaft 22. Alternately, it is understood that the second end portion 54 may be coupled to the plug-in pinion shaft 22 in any manner that permits sliding engagement.

The snap ring 72 engages a snap ring groove 76 on a first inside surface 74 of the drive nut 19. The snap ring 72 axially secures the drive nut 19 and the drive sleeve 18. Alternately, it is understood that the second end portion 54 may be configured to be engaged with the drive nut 19 in any conventional manner. The O-ring 70 tightly seals the interface between the drive nut 19 and the drive sleeve 18.

The boot groove 64 is an annular recess defined by the outer surface 78 of the second end portion 54. The boot groove 64 is formed intermediate the grooves 66, 68 and the middle portion 52. The boot groove 64 receives a portion of, and is sealingly engaged with, the boot assembly 20. Alternately, it is understood that the second end portion 54 may be configured with another feature which receives and sealingly engages the boot assembly 20.

The drive nut 19 is a hollow annular member formed from a rigid material such as a steel. It is understood that the drive nut 19 may be formed using any conventional process from any rigid material.

The drive nut 19 comprises a first portion 80 and a second portion 82. The portions 80, 82 are unitary and integrally formed. The first portion 80 radially overlaps a part of the drive sleeve second end 54. The first portion 80 has the snap ring groove 76. The first portion 80 has a larger inner diameter portion 81A than an inner diameter portion 81B of the second portion 82.

The first portion 80 has a first chamfered surface 88 proximate the snap ring groove 76 to facilitate compression of the snap ring 72 during assembly.

The inner diameter 81B of the second portion 82 has a plurality of threads 86 thereon. The drive nut threads 86 engage with a complementary set of threads on the shaft 22. The inner diameter 81B also defines a second snap ring groove 94. The shaft 22 has a complementary snap ring groove 96. A snap ring 98 is located in grooves 94, 96 to axially secure the nut 19 and shaft 22 together. The shaft 22 also has an O-ring groove 100 in which an O-ring 102 is located. The O-ring 102 seals the interface between the shaft 26 and the nut 19.

The snap ring groove 94 has a chamfered edge to facilitate removal of the nut 19, such as for repair or replacement.

The boot assembly 20 comprises a boot retainer 102 and a boot 108. As shown in FIG. 1, the boot assembly 20 is disposed on the outer race 12 and is in sealing engagement with the drive sleeve 18. The boot 108 is coupled to the boot retainer 106 by a crimped portion of the boot retainer 106. The boot 108 is sealingly engaged with the drive sleeve 18 using a clamping device (not shown). The clamping device is a band style clamp; however, it is understood that other types of clamping devices may be used.

The boot retainer 106 is an annular member formed from a rigid material, such as a metal or a plastic. The boot retainer 106 is coupled to and is sealingly engaged with the outer race 12. A first end portion 110 of the boot retainer 110 engages a shoulder 112 defined by an outer surface 114 of the outer race 12; however, it is understood that the boot retainer 106 may be coupled to the outer race 12 in any manner. A second end portion 116 has a substantially U-shaped cross-section which encloses a portion of the boot 108 to couple the boot 108 to the boot retainer 106. Alternately, the second end portion 116 may have other shapes that facilitate coupling the boot 108 to the boot retainer 106.

The boot 108 is an annular member having a substantially U-shaped cross-section formed from a resilient material, such as an elastomer. The boot 108 facilitates movement between the outer race 12 and the drive sleeve 18 while sealing engagement is maintained therebetween. A first end portion 118 of the boot 108 is coupled to the boot retainer 106 as described hereinabove. A second end portion 120 of the boot 108 is sealingly engaged with and coupled to the boot groove 64 of the drive sleeve 18 as described hereinabove.

The plug-in pinion shaft 22 is an elongate member which is drivingly engaged with the drive sleeve 18 when the constant velocity joint 10 is assembled. The plug-in pinion shaft 22 is formed from a rigid material such as steel using any conventional process. The plug-in pinion shaft 22 comprises a first end portion 122, a middle portion 124, and a second end portion 126.

The first end portion 122 of the plug-in pinion shaft 22 is a cylindrical shaped portion formed opposite the second end portion 126. The first end portion 122 comprises a plurality of outer splines 128 corresponding to the inner splines 60 of the drive sleeve 18. When the constant velocity joint 10 is assembled, the plug-in pinion shaft 22 is drivingly engaged with the drive sleeve 18 through the splines 128, 60 so that the two rotate together as one. The plurality of outer splines 128 is formed on an outer surface 130 of the plug-in pinion shaft 22. Alternately, it is understood that the plug-in pinion shaft 22 may be drivingly engaged with the plug-in pinion shaft 22 in any manner that permits sliding engagement.

The middle portion 124 is a cylindrical shaped portion of the plug-in pinion shaft 22 formed between the first end portion 118 and the second end portion 120. The middle portion 124 has a larger diameter than the first end portion 122. The two portions 122, 124 are separated by the angled transition portion 65. The snap ring and O-ring grooves 96, 100 are located in middle portion 124. The middle portion 124 also comprises a set of threads 134 for engaging with the nut threads 86. The threads 86, 134 secure the shaft 22 and the nut 19 so that the two rotate together.

The second end portion 126 is configured to be drivingly engaged with a drive component (not shown). The second end portion 126 may have a beveled pinion gear for engagement with the drive component, however, it is understood that the second end portion 126 may be configured in any manner that permits driving engagement between the plug-in pinion shaft 22 and the drive component.

At least one vent hole 136 is located in the sleeve 18. More particularly, a vent hole 136 is located in the sleeve 18 along a longitudinal axis 138 of the sleeve 18. The vent hole 136 may be located in the middle portion 52 of the sleeve 18, as shown in FIG. 1. The vent hole 136 permits air to flow out of the joint 10 via the path described below.

The path includes at least one a radial gap 140 in the splined connection between the sleeve 18 and the nut 19. The splined connection comprises the splines 60 of the sleeve 18 and the splines 128 of the shaft 22. The at least one radial gap 140 is located radially outward from the splines 60, 128. The at least one radial gap 140 may comprise a radial extension of one or more splines 60, 128 so that when the splines 60, 128 are engaged with one another a radial gap extending the axial length of the splines 60, 128 remains for air to pass through.

The path also comprises venting grooves 142 on the outside surface 130 of the shaft 22. Venting grooves 142 are engaged with venting grooves 67 as shown in FIG. 1. The venting grooves 142 may begin in the sleeve 18 and extend through the threads 86, 134. The venting grooves 142 may be within the threads 86, 134 or radially outward from them. The venting threads 142 extend through the threads 86, 134 to at least one radial aperture 144 in the nut 19. The aperture 144 extends from the second inside surface 92 of the drive nut 19 to an outside surface 146 of the drive nut 19. A check valve 148 may be located in the aperture 144. The check valve 148 permits air to escape from the joint 10 but will not let outside air, water or contaminants into the joint 10.

Figure 2:
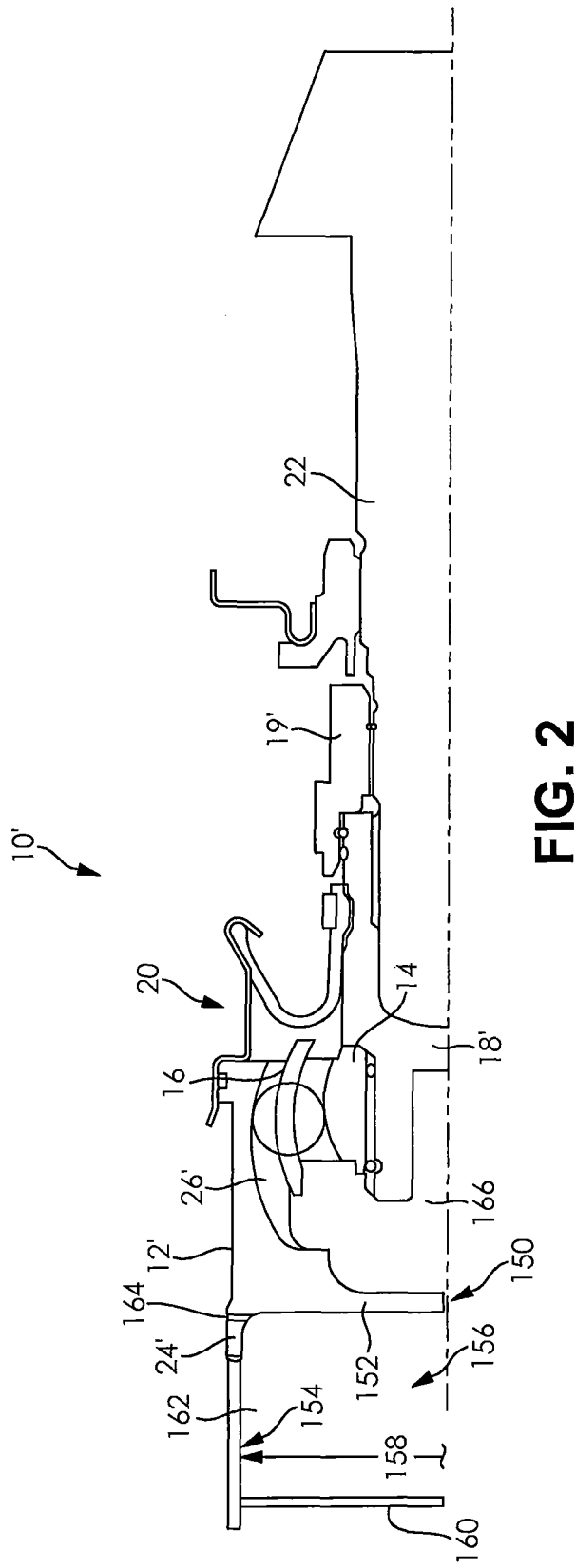
FIG. 2 is a cross-sectional side view of another embodiment of the joint.

Turning now to FIG. 2 another embodiment of the joint 10' is depicted. The joint 10' is as described and depicted above, except that FIG. 2 has an alternative venting arrangement. More particularly, the embodiment of FIG. 2 does not have a vent hole 136 in the sleeve 18', a radial gap 140 in the splined connection between the sleeve 18' and nut 19', venting grooves 142, or a radial aperture 144 in the nut 19'.

Instead, a first vent hole 150 is provided in the outer race 12'. More particularly, a first vent hole 150 is located along the longitudinal axis 138 of the outer race 12'. The first vent hole 150 is positioned in a disk shaped portion 152 of the outer race 12' that connects the circumferential outer tracks 26' and the circumferential attachment end 24'.

FIG. 2 depicts a single first vent hole 150 aligned with the longitudinal axis 138, however, additional vent holes in the disk shaped portion 152 are permissible.

The attachment end 24' of the outer race 12' is drivingly engaged with a shaft 154. The engagement is typically via welding, but other attachment methods may also be used.

The shaft 154 has a hollow interior 156 defined by substantially constant inner diameter 158 of the shaft 154. A plug 160 may be located in the hollow interior 156 where the plug 160 extends continuously across the inner diameter 158. The plug 160 is solid without any gaps or breaks and it seals in an airtight manner against the inner diameter 158.

The shaft 154, the plug 160, and outer race 12' create an interior void area 162. The interior void area 162 is in fluid communication with a second vent hole 164.

The second vent hole 164 is provided in the attachment end 24' of the outer race 12'. While one second vent hole 164 is depicted in the FIG. 2 additional vent holes may be used. The additional vent holes may be circumferentially spaced about the attachment end 24', or any spacing may be arranged between them. The second vent hole 164 permits air to leave an interior 166 of the joint 10'. Thus, air communicates from the interior 166 of the joint 10', through the first vent hole 150, through the interior void portion 156, and through the second vent hole 164, where it may be exhausted to the atmosphere.

The second vent hole 164 may be fitted with a check valve or other covering (neither being shown in the figure) in order to prevent dirt, debris or moisture from entering the joint 10' and/or clogging the vent holes 164, 150.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A vehicle joint, comprising:
 a drive sleeve, comprising:
  a first vent hole;
  a first set of splines; and
  a first set of venting grooves;
 a pinion shaft, comprising:
  a second set of splines engaged with said first set of splines, wherein a radial gap radially outboard of said engaged splines extends the length of said engaged splines;
  a second set of venting grooves engaged with said first set of venting grooves; and
  a first set of threads;
 a drive nut, comprising:
  a second set of threads engaged with said first set of threads; and
  a fluid aperture extending through said drive nut;
 wherein said first vent hole is in fluid communication with said fluid aperture through said radial gap, said first and second set of venting grooves and said first and said second set of threads; wherein said first vent hole is located in a middle portion of said drive sleeve, said first vent hole is oriented along a longitudinal axis of said sleeve.

2. The vehicle joint of claim 1, wherein said drive sleeve first set of splines are located in a first, inner diameter portion of said drive sleeve.

3. The vehicle joint of claim 1, wherein said drive sleeve first set of venting grooves are located in a second, inner diameter portion of said drive sleeve wherein said second inner diameter portion is larger than said first inner diameter portion.

4. The vehicle joint of claim 1, wherein said pinion shaft second set of splines are located on an outside surface of a first end portion of said pinion shaft having a first diameter.

5. The vehicle joint of claim 4, wherein said pinion shaft second set of venting grooves are located on said outside surface of a second end portion of said pinion shaft.

6. The vehicle joint of claim 1, wherein said radial gap is located in said drive sleeve.

7. The vehicle joint of claim 1, wherein said drive nut second set of threads is located on an inner diameter of said drive nut.

8. The vehicle joint of claim 1, wherein said drive nut has a first portion radially overlapping, in order, said drive sleeve and pinion shaft, said drive nut connected to said drive sleeve with a snap ring in said first portion, and said drive nut has a second portion radially overlapping said pinion shaft and connected thereto with a snap ring.

9. The vehicle joint of claim 1, further comprising an outer race, an inner race, a cage and a plurality of balls within said cage, wherein said inner race is engaged for rotation with said drive sleeve.

10. The vehicle joint of claim 1, wherein a second vent hole in communication with said first vent hole is located in said outer race.

11. A vehicle joint, comprising:
 a drive sleeve, comprising:
  a first vent hole;
  a first set of splines; and
  a first set of venting grooves;
 a pinion shaft, comprising:
  a second set of splines engaged with said first set of splines, wherein a radial gap radially outboard of said engaged splines extends the length of said engaged splines;
  a second set of venting grooves engaged with said first set of venting grooves; and
  a first set of threads;
 a drive nut, comprising:
  a second set of threads engaged with said first set of threads; and
  a fluid aperture radially extending through said drive nut, wherein a check valve is located within said fluid aperture.

* * * * *